United States Patent

[11] 3,579,848

[72] Inventors Tomas Hernandez
9220 S.W. 38th St., Miami, Fla. 33165;
Valentin E. Lorenzo, 119 N.E. 20th St.,
Miami, Fla. 33137
[21] Appl. No. 3,781
[22] Filed Jan. 19, 1970
Division of Ser. No. 720,259, Apr. 10, 1968,
Pat. No. 3,500,554.
[45] Patented May 25, 1971

[54] METHOD OF CONTROLLING HUMIDITY CONTAMINATION OF HYGROSCOPIC MATERIAL-HANDLING MACHINES
5 Claims, 4 Drawing Figs.
[52] U.S. Cl....................................................... 34/15,
34/51, 34/30, 34/31
[51] Int. Cl........................................................ F26b 5/04
[50] Field of Search............................................ 34/15, 51,
30, 31

[56] References Cited
UNITED STATES PATENTS
2,152,367 3/1939 Smith........................... 34/51

| 2,715,282 | 8/1955 | Nivey............................ | 34/31 |
| 3,319,346 | 5/1967 | Schuster........................ | 34/51 |
| 3,384,974 | 5/1968 | Alleman........................ | 34/31 |

*Primary Examiner*—William J. Wye
*Attorneys*—Clarence A. O'Brien and Harvey B. Jacobson ABSTRACT: The method of reducing and substantially eliminating water contamination of hygroscopic materials of the type being processed by a series of enclosed material-processing machines and conveyed from each material-processing machine to the next machine through closed material conveyance passages extending between and continuously communicated with the enclosed material-processing machines. The method comprises the step of pumping heated air of low relative humidity under pressure into the enclosed area of the last material-processing machine to which the material is conveyed and allowing the heated air to flow upstream, relative to the direction of material flow, through the material-processing machines and closed conveyance passages to the material-processing machine into which the material to be processed is first discharged.

Tomas Hernandez
Valentin E. Lorenzo
INVENTORS

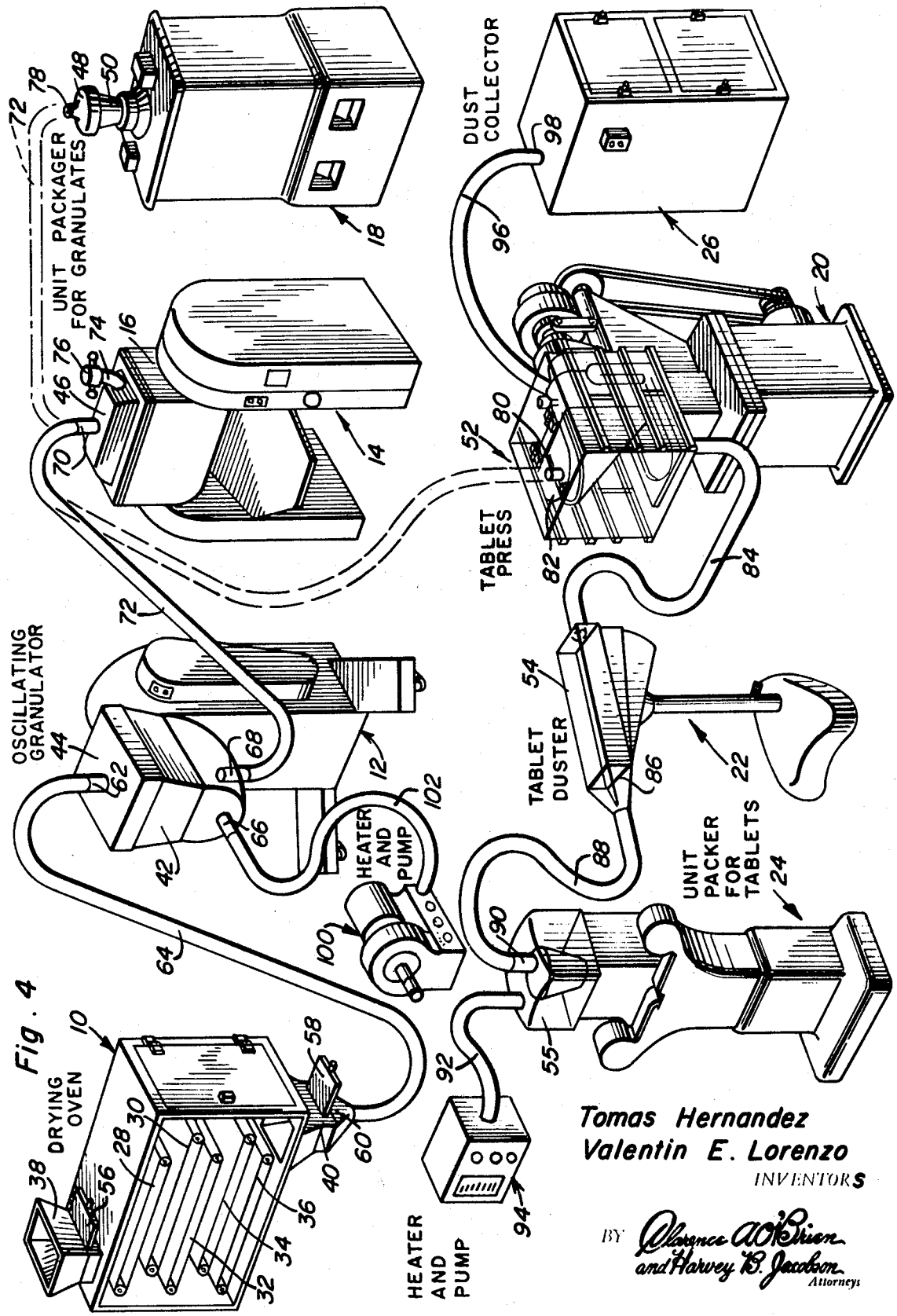

METHOD OF CONTROLLING HUMIDITY CONTAMINATION OF HYGROSCOPIC MATERIAL-HANDLING MACHINES

This application comprises a division of my copending U.S. application, Ser. No. 720,259, filed Apr. 10, 1968, now U.S. Pat. No. 3,500,554.

When medicinal tablets are formed, they are prepared from a medicinal substance and a diluent usually consisting of dextrose or a mixture of lactose and powdered sucrose in varying proportions. In many instances a moistening agent, such as a diluent alcohol is also used. In these instances the greater solubility of the medicinal substance in water, the greater must be the percentage of alcohol in the excipient. However, where the active ingredients of such tablets may be decomposed by water or alcohol, other suitable binders and moistening agents are employed. Most tablets which are compressed include an active ingredient, a diluent, a binder, a disintegrater, and a lubricant. Diluents are added when the quantity of active ingredient is small or difficult to compress. Binders give adhesiveness to the powder during the preliminary granulation and to the compressed tablet. A disintegrating agent such as starch serves to assist in the fragmentation of the tablet after administration. Lubricants reduce friction between the tablet and the wall of the die during compression and ejection cycles. In addition, they aid in preventing adherence of tablet material to the dies and punches.

It may therefore be understood that when forming some types of tablets including active ingredients which may be decomposed by water, it is desirable to reduce the possibility of these materials being subjected to high humidity conditions. In addition, when tablets are being constructed of hydroscopic materials, it is also desirable to limit their contact with high humidity air.

While drying ovens have heretofore been utilized to predry materials of compounds which are to be compressed into tablets so as to reduce the possibility of humidifying hygroscopic materials and the decomposing of other materials, such dried materials may be appreciably humidified or allowed to at least partially decompose by their being subjected to high humidity air after they are removed from drying ovens or chambers prior to being submitted to other phases of manufacturing, including packaging processes.

Accordingly, it is the main object of this invention to provide a means whereby the materials or compounds being handled will be maintained in a heated atmosphere of low relatively humidity from the time these materials and compounds are taken from drying ovens or chambers until they are packaged, either in loose granular form or in tablet form.

Another object of this invention is to provide a method compatible with conventional material-processing machines of the type utilized in producing tablets and which may be practiced in conjunction with those machines with little modification to the latter in maintaining the material being processed in an atmosphere of low relative humidity.

A final object of this invention to be specifically enumerated herein is to provide a method in accordance with the preceding objects and which will lend itself to being carried out by the utilization of attachments in conjunction with conventional material-processing machines with the attachment including structure conforming to the conventional forms of manufacture, being of simple construction and easy to install so as to provide a method which will be economical feasible.

These together with other objects and advantages which will become subsequently apparent reside in the details of construction and operation as more fully hereinafter described and claimed, reference being had to the accompanying drawings forming a part hereof, wherein like numerals refer to like parts like throughout, and in which:

FIG. 4 is a somewhat schematic overall perspective view of various material-handling apparatuses utilized in the forming of medicinal tablets and powders and the packaging of the tablets and powders with the humidity-controlling structures for carrying out the method of the instant invention operatively associated therewith.

Figure 1:
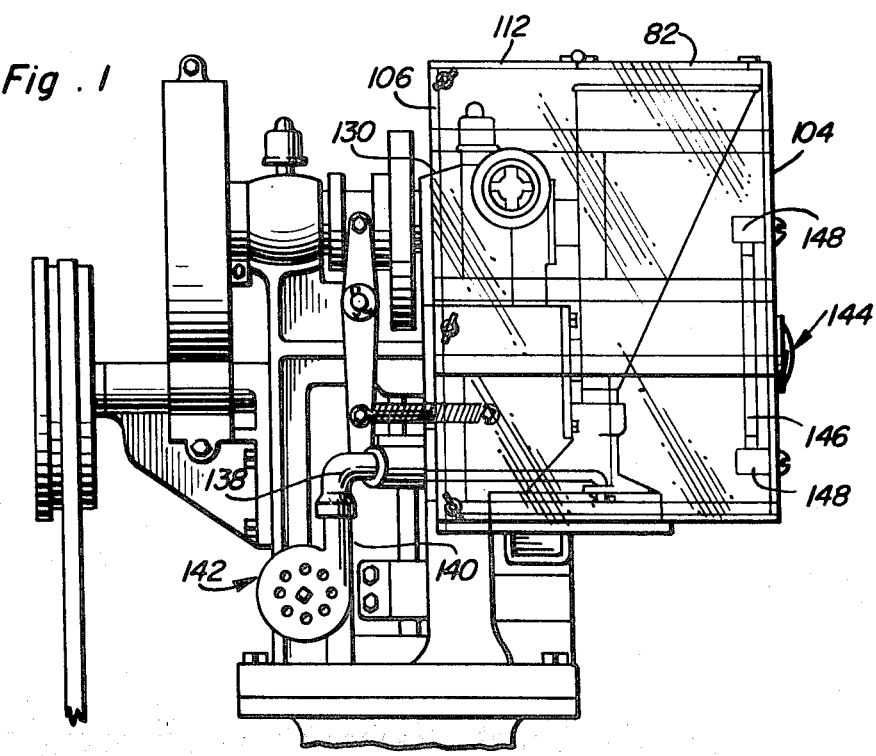
FIG. 1 is a fragmentary side elevational view of a tablet press with the portion of the tablet press actually handling material of which the tablets are to be formed enclosed within a relatively airtight enclosure having heated air pump means operatively associated therewith.

Referring now more specifically to the drawings the numeral 10 generally designates a drying oven, the numeral 12 an oscillating granulator, the numeral 14 a mixer including a tiltable hopper 16, the numeral 18 a unit packager for granulates and powders, the numeral 20 a tablet press, the numeral 22 a tablet duster, the numeral 24 a unit packer for tablets, and the numeral 26 a dust collector, see FIG. 4. The drying oven 10 may be of any conventional design including vertically spaced and suitably driven endless conveyors 28, 30, 32, 34 and 36, an inlet funnel 38 opening upwardly through the top of the oven 10 above the upper conveyor 28 and an outlet funnel 40 disposed below the outlet end of the lower conveyor 36 and opening downwardly through the bottom wall of the oven 10.

The oven 10 may be heated by any suitable means (not shown) and the endless conveyors may be powered by any suitable power source (not shown).

The oscillating granulator 12 is of conventional design and includes an upwardly opening hopper 42 and the mixer 14 as well as the unit packager 18 are also conventional in design. Further, the tablet press 20, the tablet duster 22, the unit packager for tablets 24 and the dust collector 26 are also of conventional design, although these various machines have been modified in order to enclose the portions thereof, except for the dust collector 26, which handle the material being processed.

The granulator 12 has been provided with a removable closure cover 44 for its hopper 42, the mixer 14 has been provided with a removable closure cover 46 for its hopper or receptacle 16, the unit packager 18 has been provided with a closure cover 48 for its inlet funnel 50, the tablet press 20 has been provided with an enclosure referred to in general by the reference numeral 52 for the component of the press 20 which actually processes the material to be pressed into the tablet, the tablet duster 22 has been provided with a removable closure cover 54 and the upper portion of the unit packager has been provided with a removable cover 55. In addition, the inlet funnel 38 of the oven 10 has been provided with a sliding closure door 56 and the outlet funnel 40 of the drying oven 10 has been provided with a sliding closure door 58. The outlet funnel 40 and the closure cover 44 include outlet and inlet portions 60 and 62 with which the inlet and outlet ends, respectively of a conduit 64 are communicated. Further, the lower portion of the hopper 42 of the granulator 12 includes an inlet neck 66 and an outlet neck 68 while the closure cover 46 for the mixer 14 includes an inlet neck 70, the inlet and outlet ends of a conduit 72 being communicated with the outlet neck 68 and inlet neck, respectively. Further, the closure cover 46 includes an air outlet tube 74 provided with a removable closure 76 on its outlet end. The closure cover 48 for the inlet funnel 50 of the unit packager 18 includes an inlet neck 78 to which the end of the conduit 72 remote from the mixer 14 may be connected in lieu of being connected to the outlet neck 68. Further, the end of the conduit 72 remote from the mixer 14 may also be connected to an inlet neck 80 opening through the hinged closure 82 of the enclosure 52.

The enclosure 52 defined an outlet neck (not shown) to which one end of a conduit 84 is connected and the other end of the conduit 84 opens into the closure cover 54. The end of the closure cover 54 remote from the conduit 84 defines an outlet funnel or neck 86 to which one end of a conduit 88 is connected. The closure cover 55 includes an inlet neck 90 to which the end of the conduit 88 remote from the funnel 86 is connected and a heated and dried air outlet conduit 92 extends from a controllable heater and blower assembly referred to in general by the reference numeral 94 and opens into the top of the closure cover 55. Further, the enclosure 52 also defines an outlet opening (not shown) to which the inlet end of a conduit 96 is connected and the outlet end of the conduit 96 opens into the vacuum-producing dust collector 26 as at 98. The tablet duster may be conventional in design and therefore includes its own vacuum pump (not shown) which may or may not be actuated, as desired. Also, an air heating and pumping assembly generally referred to by the reference numeral 100 is provided and includes an outlet conduit 102 which is connected to the inlet neck 66 of the receptacle or hopper portion 42 of the oscillating granulator 12.

Figure 2:
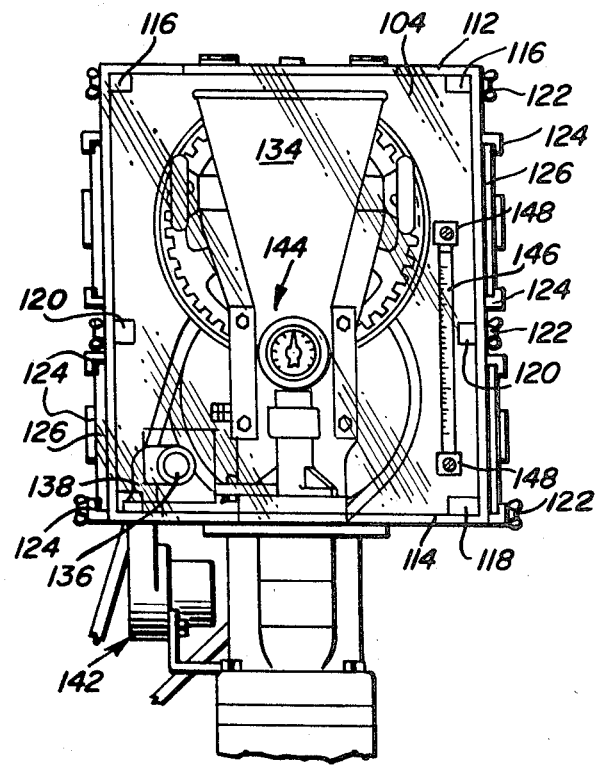
FIG. 2 is a front elevational view of the assemblage illustrated in FIG. 1 as seen from the right side thereof.
Figure 3:
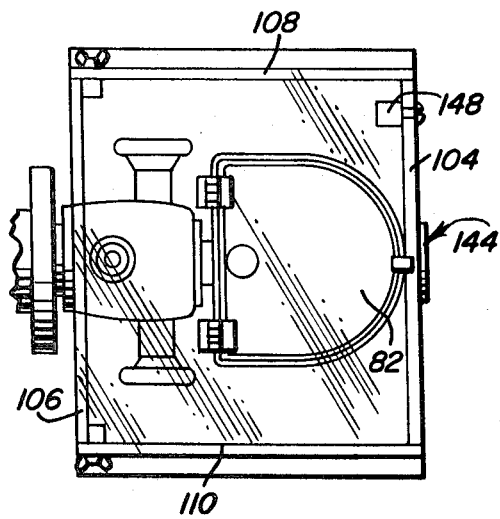
FIG. 3 is a top plan view of the assemblage illustrated in FIG. 1.

With attention now invited more specifically to FIGS. 1 through 3 of the drawings, it may be seen that the enclosure 52 defines a housing including front and rear walls 104 and 106 interconnected by means of upstanding opposite sidewalls 108 and 110 as well as top and bottom walls 112 and 114. The top and bottom walls 112 and 114 as well as the front and rear walls 104 and 106 have upper, lower and intermediate mounting block portions 116, 118 and 120 secured thereto and the opposite sides 108 and 110 are removably secured to the mounting block portions 116, 118 and 120 are means of releasable fasteners 122. The opposite sidewalls 108 and 110 each include upper and lower pairs of channel-defining members 124 from which sliding closure panels 126 are supported and each of the closure panels 126 is shiftable into and out of positions closing a corresponding opening (not shown) formed through the corresponding sidewall.

The rear wall 106 is cut away as at 130 to closely embrace the portions of the tablet press 20 extending therethrough and the bottom wall 114 also has an opening (not shown) formed therethrough which closely embraces the portions of the tablet press 20 extending therethrough. Accordingly, the hopper 134 as well as other portions of the tablet press 20 which actually handle the material to be processed into tablets are completely enclosed within the housing or enclosure 52 and the rear wall 106 of the housing 52 includes an inlet opening 136 to which the outlet end of a heated and dried air conduit 138 is connected. The heated and dried air conduit 138 includes an inlet end connected to the discharge nozzle 140 of an air heating and pumping assembly referred to in general by the reference numeral 142.

The front wall 104 has a hygrometer generally referred to by the reference numeral 144 secured therethrough and a thermometer 146 is supported inwardly of and spaced from the front wall 104 by means of mounting blocks 148, see FIG. 3. Still further, the top wall 112 includes the hinged closure cover 82 upwardly through which the inlet neck 80 is secured when the latter is utilized.

When only the basic concept of the invention is practiced, the enclosure as illustrated in FIGS. 1—3 is utilized on the tablet press 20. The hinged closure cover 82 may be opened so as to provide access to the hopper or inlet funnel 134 of the tablet press 20 and the material to be pressed into tablets may be discharged downwardly into the hopper 134. However, the interior of the enclosure 52 has already been heated by a supply of heated dry air from the air heating and pump assembly 142. Any of the closure panels or doors 126 may be left slightly ajar, or closed as desired, to provide the desired increased air pressure within the enclosure 52 and as soon as the temperature within the enclosure 52 has been raised to the desired point as indicated by the thermometer 146 and the hygrometer reading has dropped sufficiently, the material to be processed by the tablet press may be placed into the hopper 134 for pressing into tablets. The enclosure 52 thereby maintains a heated dry atmosphere about the portions of the press 20 which handle the material to be pressed into tablets and the heated atmosphere is maintained at a pressure slightly greater than the pressure of the ambient air in order that any leaks between the enclosure and the tablet press 20 will have heated dry air flowing outwardly therethrough as opposed to cooler humid air flowing inwardly therethrough into the interior of the enclosure 52 for water contamination of hygroscopic materials being handled by the tablet press 20 or deterioration of other materials being handled by the press.

When installed, the enclosure 52 is substantially permanently mounted and access to the portions of the tablet press 20 disposed interiorly of the enclosure 52 may be gained through the openings closed by the doors 126. Further, the various wall portions of the enclosure 52 are constructed of transparent material and therefore the complete normally exposed operation of the table press may be observed through the wall portions of the enclosure 52.

When only the enclosure 52 is to be utilized in conjunction with the air heating and pumping assembly 142, the closure cover 82 may be provided without the inlet neck 80 or if the inlet 80 is provided it may be suitably capped so as to prevent excessive loss of air pressure within the enclosure 52.

However, when the invention is practiced to the extent illustrated in FIGS. 4, the enclosure 52 not only includes the inlet neck 80 but is utilized in conjunction with other heating and pumping assemblies such as the assemblies 94 and 100. While the air heating and pumping assembly 142 may also be utilized, its use is not necessary and the inlet end of the conduit 96 may be secured in the inlet opening 136 in lieu of the outlet end of the conduit 138. On the other hand, if the heating and pumping assembly 142 is provided, the rear wall 106 of the enclosure 52 is provided with an additional opening similar to opening 136 in which the inlet end of the conduit 96 is secured.

The various closure covers 44, 46, 48 and 55, together with the enclosure 52 and the various conduits 64, 72, 84 and 88, completely enclose all of the components utilized to process the material which is being handled. The material to be processed is first placed into the funnel 38 of the drying oven 10 after the heating means (not shown) of the drying oven 10 has been actuated. The assemblies 94 and 100 may be actuated in order to purge all of the enclosures free of moist air although it is not necessary to actuate the assembly 94 until such time as the first batch of material is delivered to the tablet press 20.

The closure door 56 of the drying oven 10 may be opened in order that the material fed into the inlet funnel 38 may fall down upon and be handled by the various inlet conveyors 28, 30, 32 and 34 during the movement of the material through the drying oven before its discharge therefrom through the outlet funnel 40 after the closure door 58 has been opened. However, the assembly 100 is operated to pump heated air through the conduit 102, into the hopper 42, through the conduit 64 and into the oven 10.

The material discharged from the oven 10 flows through the conduit 64 into the hopper 42, the latter being disposed at a lower elevation than the drying oven 10, and after the desired batch of material has been received in the hopper 42, the oscillating granulator may be actuated to regranulate the material therein. As the material is regranulated in the oscillating granulator 12, it is discharged therefrom through the conduit 72 into the hopper 16 of the mixer 14, the hopper 16 also being at a lower elevation than the hopper 42. Thereafter, the removable cover 76 is removed and the previously dried lubricant may be added to the hopper 16 for mixing with the dried material. The operation of the assembly 100 may then be terminated and the cover 76 may be reapplied to the tube 74 after which the mixer may be actuated until the contents of the hopper 16 have been thoroughly mixed.

Thereafter, the hopper 16 may be tilted so that the mixed material therein may flow outwardly through the conduit 72, the end of the conduit 72 previously connected to the outlet neck 68 being connected to either the inlet neck 78 or the inlet neck 80, as desired. Of course, if the conduit 72 is connected to the inlet neck 78, the material processed in the granulator 12 and mixed in the mixer 14 is then processed by the packager 18 for packaging in individual packages.

On the other hand, if the conduit 72 is connected to inlet neck 80, the material discharged from the mixer as the hopper or reservoir 16 is slowly tilted is discharged into the hopper or inlet funnel 134 of the tablet press 20 and the latter acts to form tablets out of the material supplied thereto. The air heating and pump assembly 94 is of course actuated before the tablet press 20 is put into operation in order that the interior of the enclosure may be purged free of moist air. Of course, the interiors of the enclosure cover 54 and 55 will also be purged free of moist air. Further, the dust collector includes vacuum pump means (not shown) whereby air from within the enclosure 52 is pumped therefrom thereby insuring a continuous flow of heated air from the assembly 94 through the closure cover 54 and 55 and the enclosure 52.

As the tablets are discharged downwardly from the tablet press 20, they pass through the conduit 84 into the table duster in which the broken pieces of tablets and dust are removed. Then, the dusted tablets are discharged from the duster 22 into the conduit 88 and are conveyed through the latter into the closure cover 55 of the unit packager 24.

From the foregoing, it may be seen that the various material-handling machines illustrated in FIG. 6 are each enclosed in a manner such that they may be readily provided with heated dry air thus preventing the material being handled from contamination by moisture and preventing materials which deteriorate when subject to high humidity conditions from deteriorating.

As hereinbefore set forth, each of the various material-handling machines may have an air heating and pump assembly such as the assembly 142 operatively connected thereto in order that each machine will have the working forces thereof disposed in a heated dry atmosphere. On the other hand, the assemblies 104 together with the various conduit connecting the material-handling machine may be used in conjunction with or in lieu of the assembly 142 in order to maintain the materials being handled by the machines illustrated in FIG. 4 completely free of humid air from the time the materials are placed in the drying oven until they are discharged from the unit packager 18 or the unit packager 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

We claim:

1. The method of reducing and substantially eliminating water contamination of hygroscopic materials of the type being processed by first enclosed material-processing means and conveyed to subsequent enclosed material-processing means through closed material conveyance means extending between and continuously communicated with the adjacent processing means between which said conveyance means extends, said method comprising the step of pumping a heated atmosphere of low relative humidity into the enclosed area of the last material-processing means to which the material is conveyed and allowing said heated atmosphere to flow upstream, relative to the direction of material flow, through said material-processing means, said conveyance means and through the first material-processing means.

2. The method of claim 1 wherein said step of pumping a heated atmosphere of low relative humidity into the last material-processing means to which the material is conveyed includes the step of pumping said heated atmosphere in sufficient quantities and under sufficient pressure whereby to maintain the enclosed areas of said processing means and said conveyance means under pressure at least slightly greater than the pressure of the ambient atmosphere.

3. The method of claim 1 wherein the step of pumping heated atmosphere of low relative humidity into the enclosed area of the last material-processing means to which the material is conveyed includes the step of retarding the escape of heated dry atmosphere from within the enclosed material-processing and conveyance means to the extent that the pressure of the heated dry atmosphere within the enclosed material-processing and conveyance means is maintained higher than the pressure of the ambient atmosphere.

4. The method of reducing and substantially eliminating water contamination of hygroscopic materials being processed by a material-processing machine having material inlet and outlet openings, said method comprising the steps of erecting a relatively fluidtight enclosure about those working components of said machine which act upon the material being handled by the machine and through which the outlet for the machine opens, providing the enclosure with a variable flow outlet opening and a closable material inlet opening through which material from outside the enclosure may be directed to the material inlet of the machine, pumping a heated atmosphere of low relative humidity and under pressure into said enclosure, and controlling the flow of said heated atmosphere out through said variable flow outlet opening in a manner to maintain the atmosphere within said enclosure at a pressure at least slightly greater than the pressure of the ambient atmosphere.

5. The method of claim 4 wherein the step of pumping heated atmosphere into said enclosure includes the step of pumping said heated atmosphere into said enclosure through said material outlet opening.